Dec. 15, 1964  P. M. McPHERSON  3,161,769
ULTRAVIOLET SPECTROMETER WITH MEANS TO CHANGE THE LENGTH
OF THE OPTICAL PATH IN THE FLUENT MATERIAL
Filed Sept. 11, 1962  2 Sheets-Sheet 1

INVENTOR.
Paul M. McPherson
BY
Roberts, Cushman & Grover
ATT'YS

Dec. 15, 1964         P. M. McPHERSON         3,161,769
ULTRAVIOLET SPECTROMETER WITH MEANS TO CHANGE THE LENGTH
OF THE OPTICAL PATH IN THE FLUENT MATERIAL
Filed Sept. 11, 1962                         2 Sheets-Sheet 2

United States Patent Office 3,161,769
Patented Dec. 15, 1964

3,161,769
ULTRAVIOLET SPECTROMETER WITH MEANS TO CHANGE THE LENGTH OF THE OPTICAL PATH IN THE FLUENT MATERIAL
Paul M. McPherson, Acton, Mass., assignor to McPherson Instrument Corporation, Acton, Mass., a corporation of Massachusetts
Filed Sept. 11, 1962, Ser. No. 222,781
12 Claims. (Cl. 250—43.5)

This invention relates to ultraviolet spectroscopy and more particularly to the measurement of the absorption of radiation by various, particularly gaseous, samples.

Absorption studies in the short wavelength regions have heretofore been hampered by the lack of a usable double beam or other comparison system by which the energy transmitted through the sample at a given wavelength may be compared with the incident energy. Such a system is particularly necessary in the short wavelength regions because of the large spectral discontinuities found in the energy outputs of the available light sources. Most conventional double beam systems are unusable for wavelengths much shorter than 2000 A. because in these prior art systems each beam must be reflected several times. For wavelengths shorter than 2000 A. the mirror surfaces absorb too much energy for reasonable overall efficiency. At wavelengths below approximately 1050 A. another problem arises in that there are no materials readily available having transmission characteristics which would permit them to be used as windows in a sample cell.

Accordingly, a prime object of the present invention is to provide apparatus for measuring the absorption of radiation by a sample, which apparatus does not involve the use of either mirrors or windows and which is therefore usable to very short wavelengths.

The apparatus contemplated for this purpose involves a chamber for containing the sample material and having an aperture through which a beam of radiation may be admitted. Within the chamber there is provided a means for bringing a detecting means into said beam first at a position near the aperture and then at a position more removed from the aperture whereby the relation of the intensities measured by the detecting means is representative of the absorption of the sample material at the particular wavelength involved. In one aspect the invention contemplates that the detecting means utilize a fluorescent detecting element and that there be provided, in alignment with the admitted radiation beam, a photodetector responsive to the fluorescence.

In a more specific aspect the apparatus comprises: a chamber for holding the sample, the chamber including an aperture for admitting a beam of radiation; a drum rotatable within the chamber; a first plurality of light path defining means carried by said drum, each of which can be brought into alignment with the radiation beam and carries a detecting element at its end nearest said aperture; a second plurality of light path defining means carried by said drums, each of which can be brought into alignment with the radiation beam by rotation of said drum and carries a fluorescent detecting element at its end furthest from said aperture; and a photodetector located in alignment with the radiation beam on the side of said drum opposite said aperture.

For the purpose of illustration presently preferred embodiments of the inventions are shown in the accompanying drawings, in which.

Figure 1:
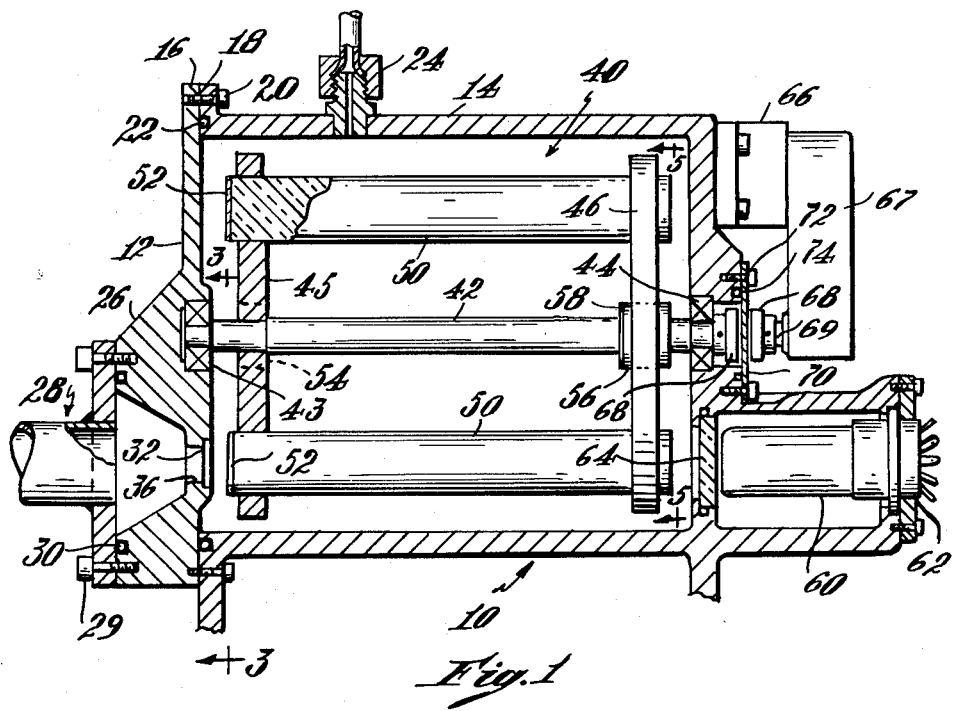
FIG. 1 is a side view, largely in section, of an ultraviolet absorption measuring apparatus in which detecting elements are carried by a rotatable drum assembly.

Referring now to FIG. 1 the apparatus shown therein is built around a two part chamber 10 for containing the sample whose absorption characteristics are to be measured. The chamber is constructed in two parts 12 and 14 which are joined at mating flanges 16 and 18 by bolts 20. An O-ring 22, set in a groove in the chamber part 14, provides a vacuum seal. The chamber part 14 is provided with an appropriate inlet fitting 24 through which a sample gas may be admitted to the chamber.

The chamber part 12 includes a coupling extension 26 by which the measuring apparatus may be mounted relative to an appropriate source of ultraviolet radiation. Depending upon the particular experiment to be performed, an appropriate source of radiation may be the grazing-incidence monochromator shown in my copending patent application Serial No. 187,775, filed April 16, 1962, and entitled Ultraviolet Monochromator. The exit beam tube structure 28 from the source may be clamped to the coupling extension 26 by bolts 29, an appropriate seal being supplied by an O-ring 30.

Figure 3:
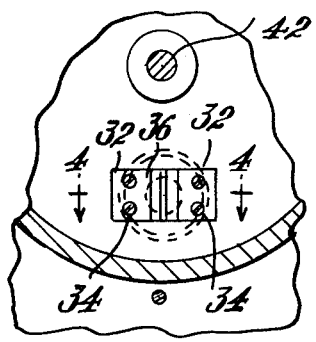
FIG. 3 is a section substantially on the line 3—3 of FIG. 1.
Figure 4:
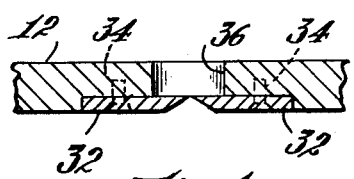
FIG. 4 is a section substantially on the line 4—4 of FIG. 3.
Figure 6:
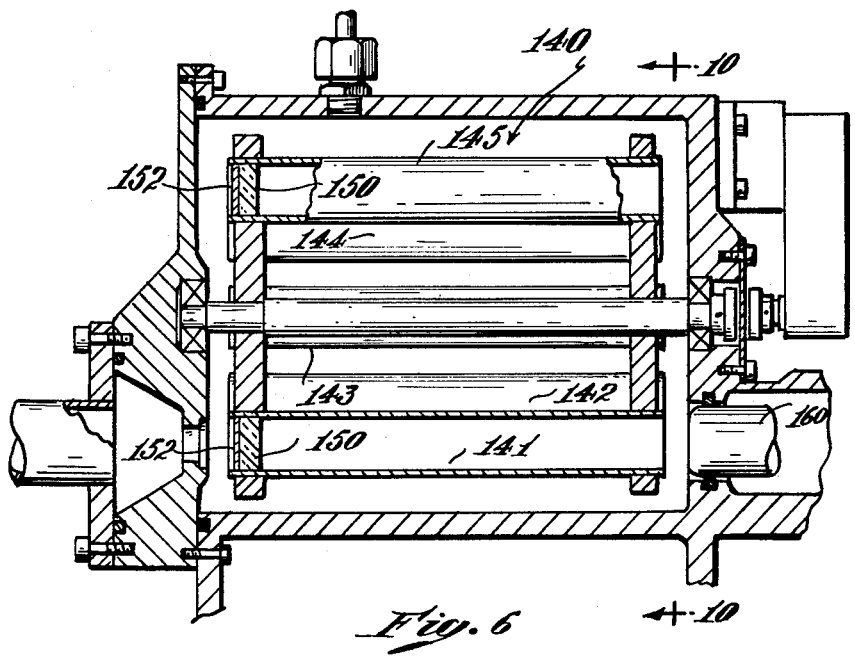
FIG. 6 is a side view, largely in section, of a modification.

Preferably the absorption measuring apparatus includes the exit slit defining means for the monochromator with which it is used. In the apparatus illustrated the slit is defined by the plates 32 which, as may be seen in FIGS. 3 and 4 are secured by means of screws 34 so as to mask an opening 36 in the part 12. The aperture defined between the plates 32 thus serves both as the wave-length-defining exit slit for the monochromator and the aperture through which the measuring beam of radiation is admitted to the sample chamber.

Within the chamber 10 there is provided a rotatable drum-like assembly 40 which includes a shaft 42, journaled in the chamber 10 by ball bearings 43 and 44, and a pair of support disks 45 and 46 which are mounted on the shaft 42. The support disks 45 and 46 carry a plurality of light path defining means each of which is positioned, relative the shaft 42, so that it can be brought into alignment with the beam of radiation admitted to the chamber through the slit defined by the plates 32. In the embodiment shown in FIGS. 1–5 there are provided two types of light path defining means. The first type, one of which is shown in alignment with the slit in FIG. 1, involves a cylindrical transparent rod 50, the front face of which is provided with a coating 52 of a suitable fluorescent detecting substance such as sodium salicylate. It should be understood that by the term transparent as used herein is meant transparent to the fluoresced radiation rather than transparent to the incident ultraviolet radiation. A similar rod of this same type is provided in a directly opposite position on the disks 45 and 46.

Figure 2:
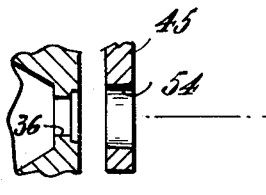
FIG. 2 is a view, similar to a portion of FIG. 1, showing the drum assembly rotated through ninety degrees.
Figure 5:
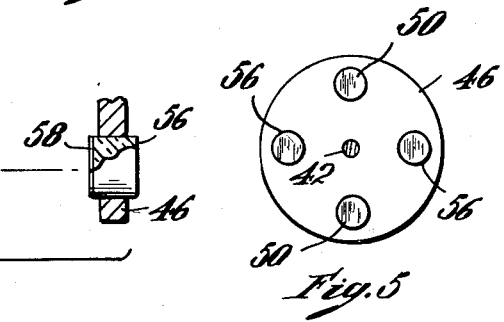
FIG. 5 is a section substantially on the line 5—5 of FIG. 1.

The second type of light path defining means, shown in alignment with the slit in FIG. 2, involves merely an aperture 54 in the front disk 45 and a transparent disk 56 carried by the back support disk 46 in alignment with the aperture 54. The front face of the transparent disk 6 is provided with a fluorescent detecting coating 58 similar to that applied to the rods 50. Light path defining means of the second type are distributed around the support disks 45 and 46 in alternation with those of the first type. In the embodiment shown in FIGS. 1–5, opposed pairs are illustrated. Increased numbers of such means may of course be used, the number being chosen to yield dynamically balanced structure.

On the opposite side of the chamber 10 from the slit defining plates 32 is provided a conventional photomultiplier tube 60. A socket 62 provides support and the necessary electrical connections to this tube and the tube is exposed to light in the chamber through a sealed window 64.

An electric motor 66 with appropriate gearing 67 is provided to rotate the drum structure 40 but, in order that there be no rotating or sliding seals operating into the sample chamber, there is also provided a magnetic drive mechanism involving two magnetic coupling elements 68 one of which is attached to the drum shaft 42 and the other of which is attached to the gearing shaft 69. The two elements 68 are separated by a non-conductive non-magnetic plate 70 secured to the chamber part 14 by bolts 72 and vacuum sealed by the O-ring 74. Preferably the main chamber is of circular cross-section so that a gaseous sample will rotate with the drum.

The operation of the device is as follows:

The chamber is filled with a gaseous sample through the inlet 24, a beam of radiation is admitted to the chamber from between the slit-defining plates 32, and the drum structure 40 is caused to rotate continuously by the motor 66. When one of the rods 50 having a fluorescent coating 52 at its end nearest the slit swings into alignment with the beam of admitted radiation as shown in FIG. 1, the coating 52 will fluoresce with a brilliance which is proportional to the intensity of the ultraviolet radiation beam at that point. This fluorescence is transmitted down the rod 50 and is detected and measured by the photomultiplier tube 60. The electric signal obtained from the photomultiplier is then representative of the intensity of the ultraviolet beam at a point only shortly removed from the slit.

When the drum assembly 40 has rotated further so that an aperture 54 is in alignment with the radiation beam as shown in FIG. 2 the beam must traverse a substantial column of the sample gas before encountering the detecting element 58. The corresponding detecting element will accordingly fluoresce with a brilliance which is proportional only to the intensity of the ultraviolet radiation beam after having traversed a substantial distance through the sample gas. This fluorescence will be detected essentially directly by the adjacent photomultiplier tube 60 and the electric signal obtained therefrom will be representative of the strength of the admitted beam after absorbtion.

As the drum 40 rotates continuously the output signal from the photomultiplier will, of course, be a series of pulses which alternate in amplitude between the two signal levels. If desired, the phototube may be blanked between pulses so as to reduce noise. The two interlaced pulse signals may be separated, measured and compared using synchronous detection techniques in a variety of ways well known in the art, the synchronization being taken from the motor 66 or the drive 67.

It should be noted that, although some absorbtion of the admitted beam by the sample gas occurs before there is any possibility of encountering a detecting element, this loss does not affect the accuracy with which the absorbtion factor may be determined since this loss occurs in both beam paths before the point at which the reference level measurement is taken. The percentage of absorbtion measurement is thus based only on a path length equal to the distance between the two detecting element positions.

As the energy levels available for ultraviolet spectroscopy are typically too low to permit the use of a double monochromator for obtaining input radiation of outstanding spectral purity, it is contemplated that the absorption measuring apparatus according to the invention may include means for measuring noise energies apart from the signal energies.

It has been found that, in ultraviolet investigations, the greatest part of the background noise level arises from scattered light of wavelengths quite different from those under consideration, the noise being largely visible light. In the present apparatus, a measurement representative of the background noise energy can be obtained by including within the rotating drum structure a third type of light path defining means incorporating a filter which blocks the wavelengths for which measurements are being taken but which passes the noise energies. It is not necessary that this filter be extremely selective in order to permit much improved accuracy of absorption measurement. For measuring wavelengths shorter than 1500 A., a quartz window will provide suitable filtering characteristics and for wavelengths shorter than 1950 A., a lithium fluoride window will yield a background noise measurement of considerable accuracy. Except for the addition of the filter the incident radiation is preferably treated in the noise-measuring light path exactly as in the reference level path. In particular the noise-measuring light path should include a detecting element such as the sodium salicylate coatings used in the ultraviolet measuring paths since these elements typically introduce substantial attenuation at the visible wavelengths.

As some sample gases may themselves fluoresce as a result of being exposed to ultraviolet radiation, it is further contemplated that the drum include a fourth type of light path defining means for providing a noise measurement which includes the fluorescence of the column of gas in the absorption path. This measurement can then be used to correct the intensity-after-absorption measurement.

An embodiment illustrating the aforesaid correction features and certain other modifications is shown in FIGS. 6–10. In this device the drum structure 140 carries eight similar tubes 141–148. One opposed pair of tubes 141 and 145 carry, at their ends nearest the slit, transparent disks 150 having a fluorescent detecting coating 152 on their front faces. One of these tubes (141) is shown in alignment with the entrance slit in FIG. 6. These tubes provide a reference level signal as the rods 50 shown in FIG. 1. To provide good conduction of the fluoresced radiation to the phototube 160, the interior surfaces of these tubes may be silvered.

A second set of tubes 143 and 147 carry similar disks 156, having coatings 158, at their ends furthest from the slit. One of these tubes is shown in alignment with the slit in FIG. 8. These tubes provide an intensity-after-absorption measurement as the disk 56 in FIG. 1.

Figure 7:
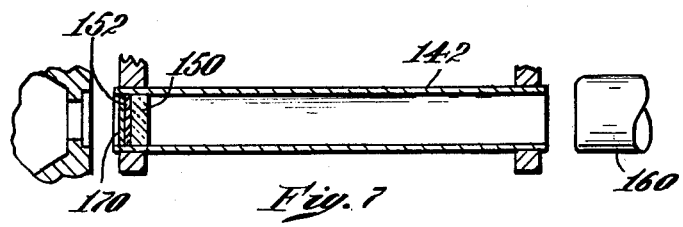
FIG. 7 is a view, similar to a portion of FIG. 6, with the drum assembly rotated forty-five degrees.
Figure 8:
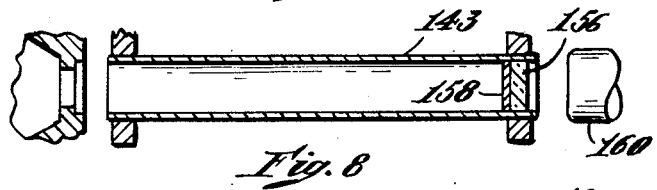
FIG. 8 is a view, similar to FIG. 7, with the drum assembly rotated another forty-five degrees.

A third type of tube 142 is shown in alignment with the slit in FIG. 7. This tube carries, in addition to a disk 150 having a detecting coating 152 which matches that in the tube 141, a filter window 170. The characteristics of the filter are chosen to block the measuring radiation and to pass as much of the noise energy as is practical.

Figure 9:
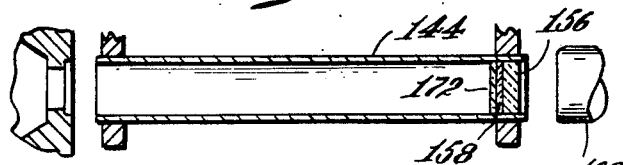
FIG. 9 is a view similar to FIG. 8 with the drum assembly rotated still another forty-five degrees.
Figure 10:
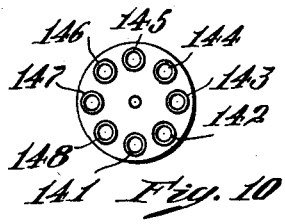
FIG. 10 is a section on the line 10—10 of FIG. 6.

A fourth type of tube 144, shown in alignment with the slit in FIG. 9, carries a disk 156 having a coating 158 which matches that in the intensity-after-absorption tube 143 and a filter window 172 similar to the filter 170. These elements are placed at the end of the tube 144 furthest from the slit to provide a measurement of noise energies which includes any self-fluorescence of the sample gas. This noise measurement can thus be used to correct the intensity-after-absorption measurement taken with the tube 143.

While particular embodiments have been explained in detail it should be understood that the invention includes

I claim:

1. Apparatus for measuring the absorption of radiation by a sample comprising: a chamber for containing the sample, said chamber including an aperture for admitting a beam of radiation; means, including a plurality of detecting elements, for bringing detecting elements into said beam alternatingly at a position adjacent said aperture and at a position more distant from said aperture along said beam whereby the relation of the intensities measured by said elements in the respective positions is representative of the absorption of the sample material.

2. Apparatus, according to claim 1, in which said detecting elements comprise a fluorescent material and in which the apparatus further includes a photodetector, responsive to the fluorescence of said detecting elements, in alignment with the beam.

3. Apparatus for measuring the absorption of radiation by a sample comprising: a chamber for containing said sample, said chamber including an aperture for admitting a beam of radiation; a member rotatable within said chamber around an axis, said axis and the optical axis of said beam lying in a common plane; a first detecting element carried by said member at a position spaced from its axis of rotation such that said detecting element may be swung into the beam of radiation at a first point along said beam; and a second detecting element carried by said member, said second element being spaced axially and angularly around said axis from said first detecting element in a position such that it also may be swung into the radiation beam at a second point further from said aperture along said beam, whereby the beam length of the radiation beam before striking a detecting element may be periodically altered by rotating said member and the relation of intensities measured by said elements at their respective points along said beam is representative of the absorption of the sample material.

4. Apparatus according to claim 3 in which said detecting elements comprise fluorescent substances and said chamber further includes photodetector means positioned in alignment wtih said radiation beam.

5. Apparatus for measuring the absorption of radiation by a sample comprising: a chamber for holding said sample, said chamber including an aperture for admitting a beam of radiation; within said chamber a rotatable member including a plurality of light path defining means oriented so that successive ones of said means can be brought into alignment with the radiation beam by rotating said member; a plurality of detecting elements carried one each by said light path defining means at alternating ends of the light paths so defined.

6. Apparatus according to claim 5 in which said detecting elements comprise fluorescent substances and said chamber further includes photodetector means in alignment with the beam of radiation.

7. Apparatus according to claim 6 including a further plurality of light path defining means carrying filters which block the measuring radiation wavelengths and pass some other wavelengths.

8. Apparatus according to claim 7 in which said filters are at the ends of said light path defining means opposite said aperture whereby the fluorescence of a sample can be measured.

9. Apparatus for measuring the absorption of radiation by a sample comprising: a chamber for holding said sample, said chamber including an aperture for admitting a beam of radiation: a drum member rotatable within said chamber; a plurality of transparent rods carried by said drum member each of which can be brought into alignment with the radiation beam and carries a fluorescent detecting element at its end nearest said aperture; a plurality of transparent disks carried by said drum member at its end furthest from said aperture; a plurality of fluorescent detecting elements carried by the faces of said disks nearest said aperture; and a photodetector located in alignment with the radiation beam on the opposite side of said chamber from said aperture.

10. Apparatus for measuring the absorption of radiation by a sample comprising: a chamber for holding said sample, said chamber including an aperture for admitting a beam of radiation; a drum rotatable within said chamber; a first plurality of light path defining tubes carried by said drum, each of which can be brought into alignment with the radiation beam and carries a fluorescent detecting element at its end nearest said aperture; a second plurality of light path defining tubes carried by said drum each of which can be brought into alignment with the radiation beam by rotation of said drum and carries a fluorescent detecting element at its end furthest from said aperture; and a photodetector located in alignment with the radiation beam on the side of said drum opposite said aperture.

11. Apparatus according to claim 10 in which said chamber is of circular cross section so that a gaseous sample can rotate with the drum.

12. Apparatus according to claim 10 including motor and magnetic coupling means for rotating said drum from outside of the chamber.

References Cited in the file of this patent

UNITED STATES PATENTS

| | | |
|---|---|---|
| 2,720,594 | Hutchins | Oct. 11, 1955 |
| 2,761,067 | Troy | Aug. 28, 1956 |
| 2,904,687 | Sabcov | Sept. 15, 1959 |
| 2,918,578 | Friedman | Dec. 22, 1959 |
| 2,922,888 | Faulkner | Jan. 26, 1960 |
| 2,931,905 | Coha | Apr. 5, 1960 |
| 3,103,546 | Kapany | Sept. 10, 1963 |